United States Patent
Woodall et al.

[11] Patent Number: 5,600,723
[45] Date of Patent: Feb. 4, 1997

[54] CRYPTOGRAPHICALLY SECURE ELECTRIC FUEL PUMP SYSTEM

[75] Inventors: Phillip J. Woodall, Towson, Md.; Daniel R. Danowski, Bowling Green, Ohio; Anthony Bernot, Maricopa, Ariz.; Karl H. Blomgren, Towson, Md.; Richard M. Sturgeon, Lucas, Ohio

[73] Assignee: AlliedSignal Inc., Morristown, N.J.

[21] Appl. No.: 362,722

[22] Filed: Dec. 23, 1994

[51] Int. Cl.$^6$ ............................. H04L 9/32; H04L 9/00; B60R 25/04
[52] U.S. Cl. ..................... 380/23; 380/46; 380/49; 380/50; 340/825.31; 340/825.34
[58] Field of Search ................. 380/21, 23, 46, 380/49, 50; 340/825.31, 825.34

[56] References Cited

U.S. PATENT DOCUMENTS

| | | | |
|---|---|---|---|
| 3,907,060 | 9/1975 | Burton et al. | 180/287 |
| 4,158,874 | 6/1979 | Ellsberg | 340/825.31 X |
| 4,477,874 | 10/1984 | Ikuta et al. | 340/825.31 X |
| 4,733,638 | 3/1988 | Anderson | 123/198 B |
| 4,987,406 | 1/1991 | Reid | 340/539 |
| 5,006,843 | 4/1991 | Hauer | 340/825.31 |
| 5,254,842 | 10/1993 | Posner et al. | 340/825.31 X |
| 5,289,177 | 2/1994 | Wake | 340/825.31 |
| 5,412,378 | 5/1995 | Clemens | 340/825.34 |
| 5,481,253 | 1/1996 | Phelan et al. | 340/825.31 |

Primary Examiner—Bernarr E. Gregory
Attorney, Agent, or Firm—Howard G. Massung

[57] ABSTRACT

A vehicle anti-theft system in the form of a mechanically interengagable electronic key and lock includes stored key and vehicle identifiers in both the key and in the lock. A random number is generated in the lock each time the vehicle ignition switch is closed and that random number is used to encode one of the identifiers for transmission to the key. The key uses the corresponding stored identifier to recover the random number. The other stored identifier is then encoded using the recovered random number and the encoded other identifier is returned to the lock. The lock uses the generated random number to recover the second identifier for comparison to its stored value. If the comparison fails, vehicle operation is prevented. The system may effect several trials, each using a new random number before refusing further attempts. The lock electronics is preferably disposed in the vehicle fuel tank and controls operation of the vehicle fuel pump.

20 Claims, 2 Drawing Sheets

CRYPTOGRAPHICALLY SECURE ELECTRIC FUEL PUMP SYSTEM

SUMMARY OF THE INVENTION

The present invention relates generally to systems for preventing unauthorized access and more particularly to such a system which prevents unauthorized operation of a vehicle.

It is a comparatively easy task for an accomplished thief to open a locked automobile door and bypass ("hot wire") or break the conventional keylock ignition system. Attempts to avoid vehicle theft have included mechanically locking the steering wheel with the ignition keylock, the addition of motion sensing or other alarm systems, independently mechanically locking the steering wheel, and a host of other schemes. None have been completely satisfactory due to either inconvenience to the authorized users or the ability of thieves to circumvent the security system.

Among the several objects of the present invention may be noted the provision of a vehicle key lock system which eliminates the possibility of "hot wiring" a vehicle by bypassing or breaking the conventional mechanical key lock protected ignition; the provision of a system which eliminates the possibility of duplicating a vehicle key; the provision of an electronic key which can neither be duplicated nor have the data extracted therefrom for later use; the provision of an electronic key and lock combination which precludes access to keying information by monitoring the interchange of data between the key and the lock; the provision of security circuitry buried in the bowels of a vehicle to effectively prevent direct access thereto by a thief; and the provision of a secure system which is immune to unauthorized access by guessing using a key mimicking device. These as well as other objects and advantageous features of the present invention will be in part apparent and in part pointed out hereinafter.

In general, an electronic lock has an electronic key for actuating the lock only if the lock and key are a compatible pair. There are storage devices in the lock which store first and second fixed and unequal identifiers. There is a source of random signals in the lock and an arrangement for combining the first fixed identifier with a first random signal, and transmitting a combined signal to the key. The key has storage devices storing a third fixed identifier and a fourth fixed identifier which is different from the third fixed identifier. An arrangement in the key combines the transmitted combined signal with the third fixed identifier to recreate the random signal only if the first and third fixed identifiers are the same. Circuitry in the key then recombines the recreated random signal with the stored fourth fixed identifier and transmits the recombined signal to the lock. In the lock, the transmitted recombined signal is combined with the first random signal to recreate the fourth fixed identifier. The recreated fourth fixed identifier is them compared with the stored second fixed identifier, and the electronic lock is actuated only if the fourth and second fixed identifiers are the same. A new random signal may be generated a few times as a retry if the fourth and second fixed identifiers are not the same, but the number of new random signals generated is counted and the system is disabled after a predetermined number of new random signals have been generated.

Also in general, and in one form of the invention, A vehicle security system precludes operation of the vehicle by unauthorized persons by providing an authorized operator with a key module which is removable from the vehicle by the operator. There is a fuel tank module disposed along with a fuel pump within the vehicle fuel tank, and circuitry within the fuel tank module which is actuated by the key module, but only after the appropriate interchange of signals between the key and fuel pump modules, to enable the vehicle fuel pump.

BRIEF DESCRIPTION OF THE DRAWING

Corresponding reference characters indicate corresponding parts throughout the several views of the drawing.

DESCRIPTION OF THE PREFERRED EMBODIMENT

Figure 1:
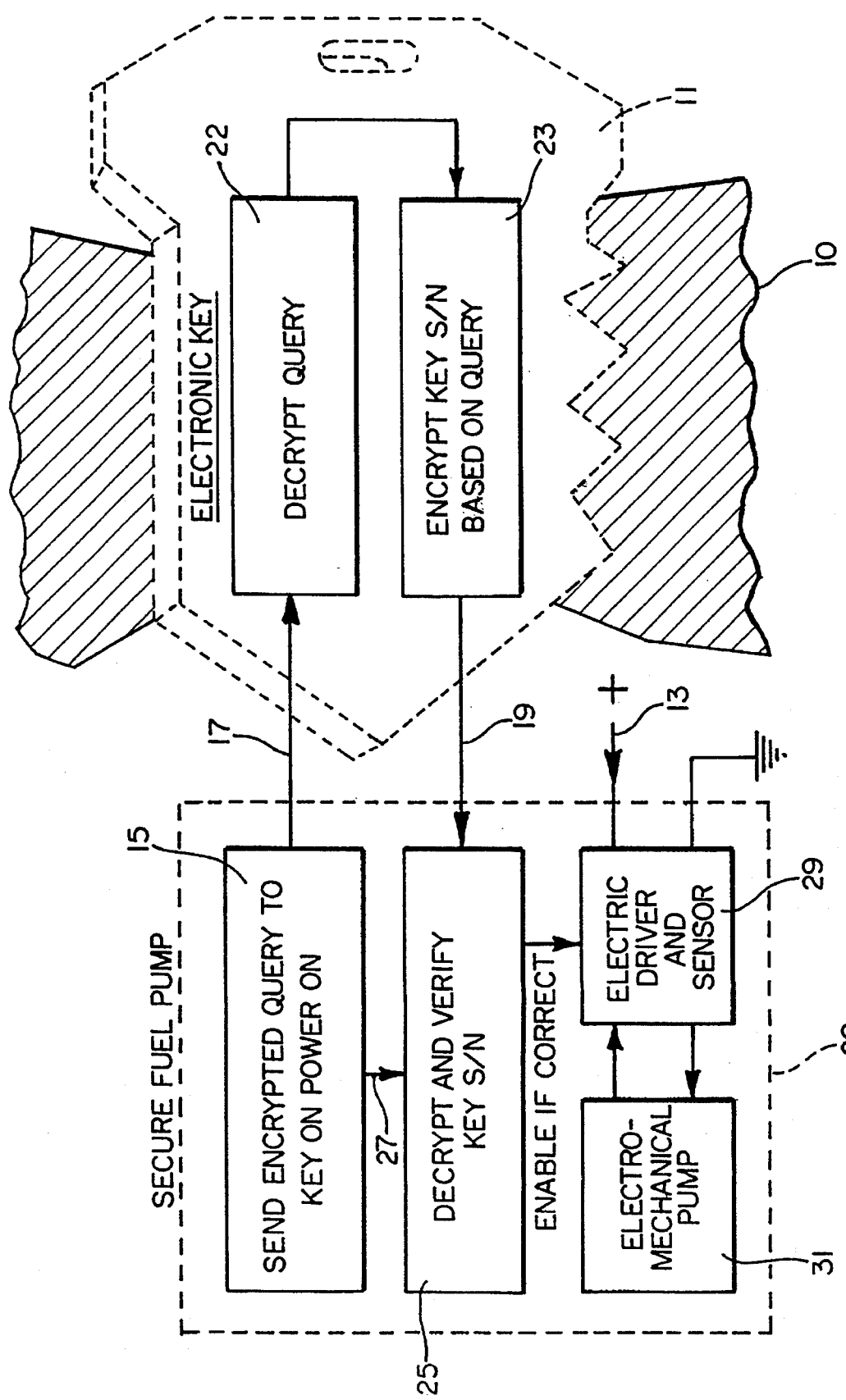
FIG. 1 is a functional block diagram of a vehicle fuel pump key and lock combination illustrating the invention in one form.

FIG. 1 illustrates a vehicle security system for preventing operation of the vehicle by unauthorized persons. In this system, a key 11 is insertable into the ignition switch 10 for enabling the vehicle ignition system by supplying power available from source 13 to initiate the operation of electric circuit 15. A pair of shielded wire cables 17 and 19 extend between the vehicle fuel pump module and the key interface interconnecting the electronic circuitry within the key to that in the fuel pump module located within the vehicle fuel tank 20 when the key is inserted into the ignition switch. A coded query is sent from circuit 15 to a decoding circuit 22 within key 11. The query is decoded and the decoded query used to encode a response within circuit 23. The response is returned to the fuel pump module and decoded at 25. This decoding requires knowledge of the particular query sent as supplied on line 27 from circuit 15. If decoding reveals the proper response, the fuel pump driving circuit 29 is enabled and the pump 31 operates normally. If the response is improper driving circuit 29 is not activated and the request for fuel to operate the vehicle is denied.

Figure 2:
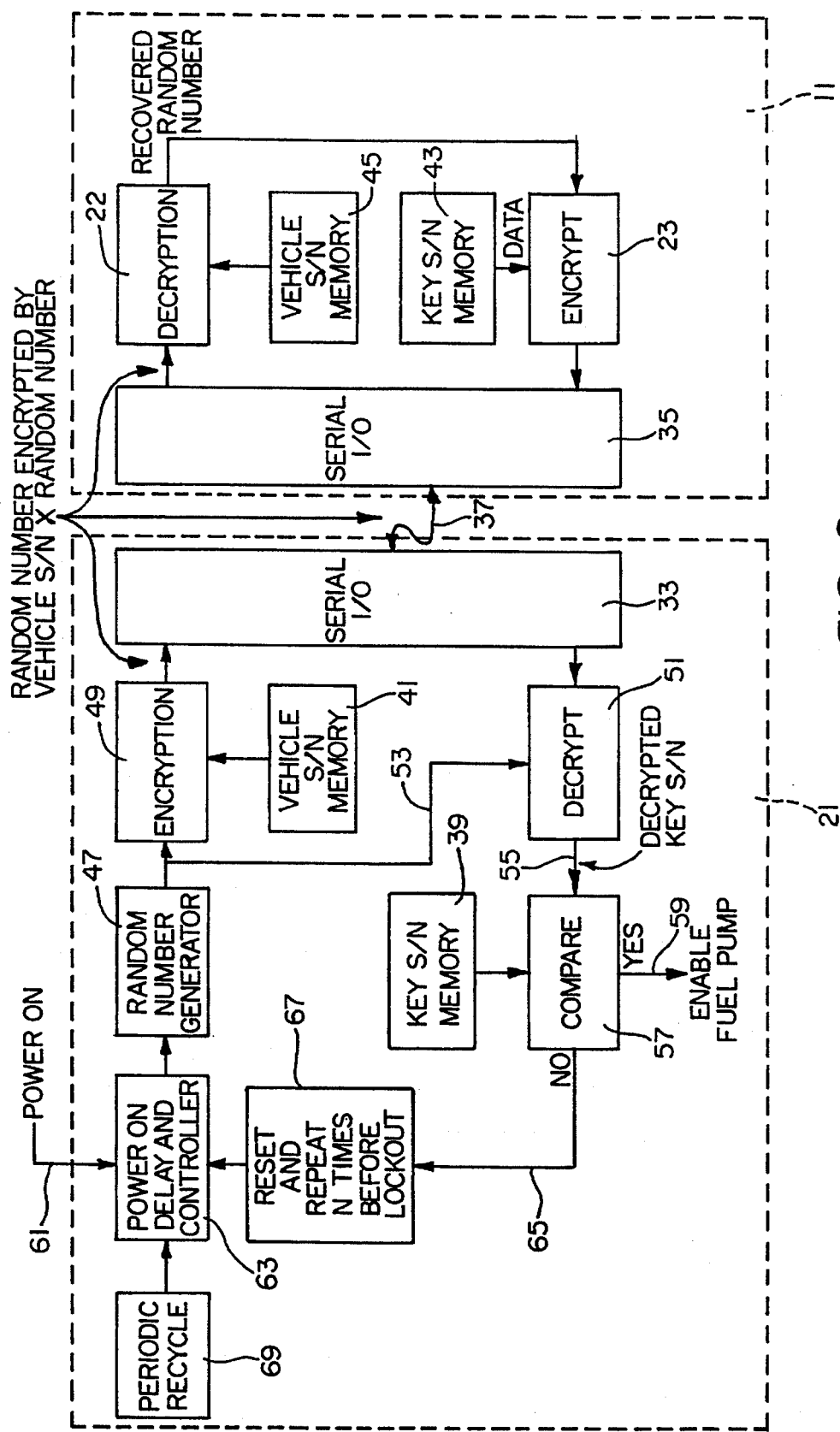
FIG. 2 is a more detailed block diagram of the electronic portions of the key and lock combination of FIG. 1.

In FIG. 2 illustrates a desired and simple vehicle security system which includes serial input output circuitry 33 and 35 and along with appropriate timing of the signals allows information to only flow in one direction at a time on a single conduit or line 37. Of course, other communication links such as radio frequency or fiber optic communication paths between the key 11 and the fuel pump module 21 may be used. The security system as illustrated in FIG. 2 includes a fuel pump module 21 which a first storage device 39 for retaining an storing key identification codes and a second storage device 41 for storing a vehicle identification codes. These codes are specific for each vehicle and are envisioned to be the vehicle serial number and the key serial number merely for convenience however any arbitrary dissimilar numbers may be used. Similarly, the key 11 has a first storage device 43 for storing and retaining key identification codes and a second storage device 45 for storing and retaining vehicle identification codes. If the key "fits" the vehicle, the number stored in device 39 must be the same as the number stored in device 43 and the number stored in device 41 must be the same as the number stored in device 45. Within the fuel pump module 21, a random number is generated at 47 each time the vehicle ignition is enabled. An encryption scheme at 49 combines the random signal from 47 and the stored vehicle identification from 41 and the combined random signal and stored vehicle identification are transmitted to the key 11. The random numbers and random signals are frequently more precisely called pseudorandom numbers and pseudorandom signals since they are produced by a deterministic process.

In the key, a decryption technique (appropriately matched with the encryption at 49) is employed at 22 to recover the random signal from the transmitted combined signal. As illustrated, the decryption employs the same vehicle serial number, hence the transmitted random number is recovered. The recovered random number and the key identification stored at 43 are combined in the encryption step at 23 and that combined random signal and stored key identification are transmitted back to the fuel pump module 21.

Many different encryption techniques may be used and the encryption techniques at 49 and 23 may be the same or may be quite different as desired. One simple encryption scheme is to simply add the random number and the vehicle serial number at 49 and then subtract the vehicle serial number from the transmitted sum to recover the random number.

Similarly, many different schemes for creating the random numbers at 47 may be employed. A counter modulo a relatively large number may be run at a clock rate sufficient to ensure frequent resets of the count. The counter may be run any time the fuel pump is enabled and the count frozen when the pump is disabled. Upon the next power on signal on line 61, this count may be squared and the middle n digits extracted as the random number. On retry, the previously extracted middle digits are again squared and a new set of n middle digits forms the next random number. Any of the well known linear congruential methods may also be employed. Of course, the numbers generated by such schemes are not truly "random" in the abstract sense. Theoretically, they are sometimes called pseudorandom, but they are sufficiently random to defeat a thief and the two terms will be considered synonymous herein.

In the fuel pump module 21, decryption 51 utilizes the generated random signal conveyed on line 53 to recover the key identification signal on line 55. The recovered key identification signal and the stored key identification signal are compared at 57 and a fuel pump enabling signal is issued on line 59 only if the compared key serial numbers are the same. The random number generator 47 responds, after a slight delay at 63, to initial enablement of the vehicle ignition system, that is, when lines 13 and 61 are energized. The random number generator 47 may also be enabled by a signal on line 65 indicating that the compared key identification signals are different, to generate a new random signal. The number of resets and retries is counted at 67 and is limited to a relatively few retry attempts.

Since a very long time is required to break the code by guessing techniques, and since the decryptors preferably accept guesses at a relatively low rate, a rare successful guess may be effectively defeated by periodic recycling. The system may optionally include such a recycle feature which causes the system to start over with a new random number periodically (for example, every 15 minutes) during vehicle operation causing the "guesser" to begin anew attempts to break into the system by guessing. This periodic recycling indicated at 69 effectively defeats a guessing thief.

Physical duplication of the key is effectively prevented by incorporating the cryptographic electronics (in the form of a VLSI digital integrated circuit) within the key and encapsulation the circuit in a compound that obscures inspection by light or X-rays and that results in destruction of the VLSI chip if physical disassembly is attempted.

Finally, direct access to the fuel tank module, buried as it is within the fuel tank, in an attempt to circumvent the security system is so difficult and time consuming that a thief is effectively prevented from obtaining access to the circuitry.

The method of operation of the invention should now be clear. Upon insertion of the key and actuation of the ignition system, a query (typically including a random number) is generated and encrypted (typically by combining the random number with a vehicle identification number). The encrypted query is sent to the key and decrypted. A key identifier is then encrypted based on the just recovered query and returned to be decrypted based on the original query. This allows a determination of whether the key identifier is authorized or unauthorized and the locked device is enabled only if the key identifier is determined to be authorized.

The system may be implemented using discrete digital logic, microprocessors, or some combination of circuitry. A wide variety of algorithms or other techniques may be used to generate the random numbers and to perform the encryption. Alarm systems and other protection schemes may be incorporated so long as they do not compromise the security features of the present invention.

From the foregoing, it is now apparent that a novel vehicle security system is disclosed which meets the objects and advantageous features set out hereinbefore as well as others. Numerous modifications are possible. For example, a validity test could be incorporated in the key and no reply sent back to the pump unit in response to an invalid query. Digital implementation is preferred for this system although any random signal and signals identifying the key and vehicle may be employed. In addition, while a combined ignition key and removable module 11 are convenient for a user, if desired, the module 11 may be a separate unit.

What is claimed is:

1. In a security system including an enablable device and a separate module for enabling the device, an improved method of preventing unauthorized enabling of the device wherein the improvement comprises the steps of:

generating a query encrypting the generated query;

sending the encrypted query to the module;

decrypting the query at the module;

encrypting, based on the query, a module identifying;

returning the encrypted module identifier to the device;

decrypting, based on the query, the returned encrypted module identifier;

determining whether the module identifier is authorized or unauthorized; and enabling the device only if the module identifier is determined to being authorized.

2. The improved method of claim 1 wherein the query includes a pseudorandom number and the step of generating comprises combining the pseudorandom number with a device identifier.

3. The improved method of claim 2 wherein the step of decrypting the query includes utilizing a device identifier stored in the module to determine the pseudorandom number.

4. The improved method of claim 1 wherein the device includes an electromechanical fuel pump disposed within a vehicle and the module comprises a key for enabling the vehicle electrical system, the step of generating commencing when the key enables the electrical system.

5. The improved method of claim 1 including repeating the steps of generating a query, encrypting the generated query, sending, decrypting the query at the module, encrypting a module identifier, returning and decrypting the returned encrypted module identifier only if the module identifier is determined to be unauthorized.

6. The improved method of claim 5 wherein repeating the steps is terminated after a specified number of successive determinations that the module identifier is unauthorized.

7. The improved method of claim 6 Wherein a different query is generated for each repetition of the steps.

8. The improved method of claim 1 further including periodically repealing the steps of generating a query, encrypting the generated query, sending, decrypting the query at the module, encrypting a module identifier, returning and decrypting the returned encrypted module identifier while the device is enabled to assure that the module identifier is authorized.

9. A vehicle security system for preventing operation of the vehicle without an appropriate key comprising:

a vehicle ignition switch;

a key insertable into the ignition switch for enabling the vehicle ignition system;

a fuel pump module and an electromechanical fuel pump;

means in the fuel pump module for storing a key identification and a vehicle identification;

means in the key for storing a key identification and a vehicle identification;

means in the fuel pump module for generating a pseudorandom signal;

means for combining the pseudorandom signal and the stored vehicle identification;

means transmitting the combined pseudorandom signal and stored vehicle identification to the key;

means in the key for recovering the pseudorandom signal from the transmitted combined signal;

means in the key for combining the recovered pseudorandom signal and the stored key identification signal;

means transmitting the combined pseudorandom signal and stored key identification to the fuel pump module;

means utilizing the generated pseudorandom signal to recover the key identification signal;

means for comparing the recovered key identification signal and the stored key identification signal, and for enabling the fuel pump only if the compared key identification signals are the same.

10. The vehicle security system of claim 9 wherein the means in the fuel pump module for generating a pseudorandom signal responds to initial enablement of the vehicle ignition system as well as to a determination that the compared key identification signals are different, to generate a new pseudorandom signal.

11. The vehicle security system of claim 9 wherein the means in the key for recovering the pseudorandom signal from the transmitted combined signal utilizes the vehicle identification signal stored in the key whereby, the fuel pump will be enabled only if the two stored vehicle identification signals are the same and the two stored key identification signals are the same.

12. In combination, an electronic lock and an electronic key for actuating the electronic lock only if the electronic lock and key are compatible comprising:

storage means in the lock for storing a first fixed identifier, and a second fixed identifier, different from the first fixed identifier;

a source of pseudorandom signals;

means for combining the first fixed identifier with a first pseudorandom signal, and transmitting a combined signal to the key;

storage means in the key for storing a third fixed identifier and a fourth fixed identifier different from the third fixed identifier;

means in the key for combining the transmitted combined signal with the third fixed identifier to recreate the pseudorandom signal only if the first and third fixed identifiers are the same;

means in the key for recombining the recreated pseudorandom signal with the stored fourth fixed identifier and for transmitting the recombined signal to the lock;

means in the lock for combining the transmitted recombined signal with the first pseudorandom signal to recreate the fourth fixed identifier; and means for comparing the recreated fourth fixed identifier with the stored second fixed identifier, and for actuating the electronic lock only if the fourth and second fixed identifiers are the same.

13. The combination of claim 12 further comprising means for causing the source of pseudorandom signals to generate a new pseudorandom signal if the fourth and second fixed identifiers are not the same, the means for combining responding to the new pseudorandom signal to combine the first fixed signal with the new pseudorandom signal, and transmit the new combined signal to the key, the means in the lock now combining the transmitted recombined signal with the new pseudorandom signal to recreate the fourth fixed identifier.

14. The combination of claim 13 further comprising means for counting the number of new pseudorandom signals generated and for disabling the lock after a predetermined number of new random signals have been generated.

15. The combination of claim 12 wherein the lock and key are mechanically interengagable, the interengaging thereof initiating generation of the first pseudorandom signal.

16. The combination of claim 15 wherein the switch comprises a vehicle ignition switch and the key is insertable into the ignition switch to enable the vehicle ignition system independent of the electronic lock, actuation of the electronic lock enabling the vehicle fuel pump.

17. In a vehicle of the type having a fuel tank, a fuel pump within the fuel tank, and a key module which is removable from the vehicle by an operator, an improved vehicle security system for preventing operation of the vehicle without an appropriate key module wherein the improvement comprises an appropriate key module, a fuel tank module which is disposed along with the fuel pump within the vehicle fuel tank, and circuitry within the fuel tank module actuable by the appropriate key module to enable the vehicle fuel pump.

18. The vehicle security system of claim 17 wherein the circuitry is actuated only after the appropriate interchange of signals between the key and fuel pump modules.

19. The vehicle security system of claim 18 wherein the fuel tank module has a query generating circuit and a query encrypting circuit and further comprising a communication channel for conveying the encrypted query to the key module, a query decrypting circuit in the key module, a circuit for utilizing the decrypted query to encode a key identifier, a communication channel for returning the encrypted key identifier to the fuel tank module, the circuitry within the fuel tank module actuable by the key module to enable the vehicle fuel pump comprising a circuit for decrypting the returned encrypted key identifier based on the generated query and a comparison circuit for determining whether the key identifier is authorized or unauthorized, the fuel pump being enabled only if the key identifier is determined to being authorized.

20. The vehicle security system of claim 19 wherein the query generating circuit comprises a pseudorandom number generator and a stored vehicle identifier, and the query encrypting circuit combines the pseudorandom number and the vehicle identifier.

* * * * *